United States Patent
Andersson

[19]

[11] Patent Number: 5,907,301
[45] Date of Patent: May 25, 1999

[54] PROCEDURE AND DEVICE FOR THE CONTROL OF A RADAR UNIT

[75] Inventor: Bengt Andersson, Kullavik, Sweden

[73] Assignee: Telefonaktiebolaget LM Ericsson, Stockholm, Sweden

[21] Appl. No.: 09/008,624

[22] Filed: Jan. 16, 1998

[30] Foreign Application Priority Data

Jan. 17, 1997 [SE] Sweden ................................. 9700112

[51] Int. Cl.$^6$ ....................................................... G01S 7/282
[52] U.S. Cl. ............................... 342/82; 342/88; 342/94; 342/136; 342/137
[58] Field of Search .................................. 342/82, 83, 88, 342/94, 95, 109, 110, 135, 136, 137, 194, 195

[56] References Cited

U.S. PATENT DOCUMENTS

| | | | |
|---|---|---|---|
| 3,161,870 | 12/1964 | Pincoffs | 342/59 |
| 3,162,853 | 12/1964 | Eradsell | 342/59 |
| 3,618,088 | 11/1971 | Simpson, Sr. | 342/59 |
| 3,731,310 | 5/1973 | Rittenbach | 342/59 |
| 4,336,538 | 6/1982 | Radford | 342/175 |
| 5,136,300 | 8/1992 | Clarke et al. | 342/175 |
| 5,140,332 | 8/1992 | Martin et al. | 342/202 |
| 5,302,955 | 4/1994 | Schutte et al. | 342/59 |
| 5,341,141 | 8/1994 | Frazier et al. | 342/59 |
| 5,448,243 | 9/1995 | Bethke et al. | 342/59 |

FOREIGN PATENT DOCUMENTS

| | | |
|---|---|---|
| 251 498 | 1/1988 | European Pat. Off. . |
| 0 474 613 A2 | 11/1992 | European Pat. Off. . |
| 62-153785 | 7/1987 | Japan . |
| 406059020A | 3/1994 | Japan . |
| 406138222A | 5/1994 | Japan . |
| 2 093 306 | 8/1982 | United Kingdom . |

*Primary Examiner*—John B. Sotomayor
*Attorney, Agent, or Firm*—Burns, Doane, Swecker & Mathis, L.L.P.

[57] ABSTRACT

A procedure and a device for controlling, in a radar unit for the measurement of target data, the transmission of radar pulses and the reception of target echoes originating from the transmitted radar pulses, in such a way that the performance of the radar unit increases, in order thereby to gain a longer range during a period of time. The period of time is preferably repeated continually. The period of time is divided into a first and a second partial period of time where the first and the second partial periods of time are each at least twice as long as a pulse repetition interval which is used during the first partial period of time. During the first partial period of time the radar unit is controlled so that it transmits radar pulses for the measurement of target data with a higher energy content than what is possible in a steady state. The control is carried out in such a way that the amount of transmitted energy of the radar unit during the period of time is at the most the possible energy transmission of the radar unit in a steady state during a corresponding period of time. There is thereby obtained a more efficient signal integration by means of the signal integration of the target echoes that originate from the radar unit being concentrated during the first partial period of time. The radar unit is also controlled so that it does not transmit radar pulses for the measurement of target data during the second partial period of time.

20 Claims, 2 Drawing Sheets

PROCEDURE AND DEVICE FOR THE CONTROL OF A RADAR UNIT

This application claims priority under 35 U.S.C. §§119 and/or 365 to 9700112-7 filed in Sweden on Jan. 17, 1997; the entire content of which is hereby incorporated by reference.

BACKGROUND

This invention concerns a procedure and device for the control of a radar unit in such a way that the performance of the radar unit is increased and as a result an increase in the range of the radar unit can be achieved. This application is based on application No. 9700112-7 filed on Jan. 17, 1997 in Sweden, the content of which is incorporated hereinto by reference.

BACKGROUND OF THE INVENTION

The performance of a radar unit and in particular of a reconnaissance radar is usually given in the form of its range. A suitable measurement of the range is the distance at which an approaching radar target is first detected with a particular probability by the radar unit.

An increase in the range can, for example, be achieved by means of an increase in the power output (average power) of the radar unit, by means of a larger antenna or by reducing the noise factor of the radar unit. An increase in a radar unit's output usually leads to its output stage needing to be replaced by one or more larger output stages with higher output. This unavoidably leads to a larger cooling requirement for the output stage(s) and a higher power consumption which results in a need for a more powerful power supply. The costs and the space requirements increase rapidly. In certain applications there is only a predetermined limited space available for a radar unit, as for example inside an aircraft. Radar applications where the radar unit must be located in a place with one or more physical restrictions usually make impossible any expansion of the radar unit in excess of the allocated space, the cooling capacity and/or the power supply for the purpose of achieving a greater output or for some other reason.

A larger antenna cannot always be used, as normally the size of the antenna is optimized from the start taking into account the limitations on for example size, weight and cost. Reducing the noise factor of a radar unit is extremely expensive, if indeed it is possible at all. For example, on account of a very important application, a radar unit may already have been optimized as far as noise factor is concerned, that is to say equipped with the most advanced electronics with the lowest achievable noise factor, so that a further reduction in the noise level is not possible.

Several attempts have been made to increase the range and/or output of a radar unit. The American patent U.S. Pat. No. 4,336,538 appears to describe a system that indicates a possibility of increasing the range within certain angular intervals that are considered to be of interest, using a special power unit. This is carried out by increasing the average power by increasing the pulse repetition frequency (PRF) during an angular interval that is considered to be of interest. This is carried out by transmitting radar pulses with ten different frequencies. It can be assumed to be a disadvantage that the power supply must be changed in order to be able to supply the radar transmitter with in total more energy. It can thus be considered to be a disadvantage that the method according to U.S. Pat. No. 4,336,538 appears to require considerable modification of an existing radar unit before it can be applied. It can also be considered to be a disadvantage that the less interesting angular intervals, that according to U.S. Pat. No. 4,336,538 consist of the rest of or large parts of a rotation sweep, cannot with this method benefit from an increased range as the radar unit requires a long recovery time according to the patent.

The American patent U.S. Pat. No. 5,140,332 appears to describe a radar system where pulse compression is carried out in two stages, a first stage that gives a shorter modulated pulse and a second stage that gives the final compression. The aim of the method according to U.S. Pat. No. 5,140,332 appears to be to modernize older radar stations that consist of tube-based transmitters that use short pulses, using more modern transmitters with semiconductors that use long pulses. By means of introducing a system with pulse compression in two stages the transmitter only needs to be replaced to result in a modernization and thereby an increase in performance. It can, however, be considered to be a disadvantage that the transmitter needs to be replaced and that a new pulse compression needs to be introduced in order to achieve an improvement in performance.

The American patent U.S. Pat. No. 5,136,300 appears to describe a transmitter module that, depending on the application and thereby also on the output requirement, can be combined in various numbers. Examples that are given are two modules that are used together for a weather radar and 30 modules for a launching control radar. It can, as mentioned above, be considered to be a disadvantage or it can quite simply be impossible to increase the performance by means of enlarging the transmitter using modules as this results in increased power consumption, the need for more space and a greater cooling requirement.

Already known techniques show that increasing a radar unit's range without changing the output stage and/or the power supply is a great problem. Changes to a radar unit's output stage mean that the radar unit must be modified both directly in connection with the output stage and also in connection with the changed cooling and power requirements.

SUMMARY

One aim of this invention is to describe a procedure and a device for increasing the performance of a radar unit without the disadvantages mentioned above.

Another aim of the invention is to describe a procedure and a device for increasing the performance of a radar unit without increasing the energy requirements of the radar unit.

A further aim of the invention is to describe a procedure and a device for freeing the antenna, radar transmitter and radar receiver during a partial period of time for uses other than the ordinary function of the radar unit, such as for example data communication.

The aims listed above are achieved according to the invention by means of a procedure and a device for controlling, in a radar unit for the measurement of target data, the transmission of radar pulses and the reception of target echoes originating from the transmitted radar pulses, in such a way that the performance of the radar unit increases, in order thereby to gain a longer range during a period of time. The period of time is preferably repeated continually. The period of time is divided into a first and a second partial period of time, where the first and the second partial periods of time are each at least twice as long as a pulse repetition interval which is used during the first partial period of time. During the first partial period of time the radar unit is controlled so that it transmits radar pulses for the measurement of target data with a higher energy content than what is possible in a steady state. The control is carried out in such a way that the transmitted energy of the radar unit during the period of time amounts at the most to the possible energy transmission of the radar unit in a steady state during a corresponding period of time. A more efficient signal integration is thereby obtained by means of the signal integration of the target echoes that originate from the radar unit being concentrated during the first partial period of time. The radar unit is also controlled so that it does not transmit radar pulses for the measurement of target data during the second partial period of time.

The aims listed above are achieved according to the invention also by means of a procedure for controlling the transmission of radar pulses and the reception of target echoes for the measurement of target data in a radar unit in such a way that the performance of the radar unit increases during a period of time. The performance is increased in order to achieve thereby a longer range. The radar unit comprises range bins/resolution elements (range gates, range windows) in which target echo energy is signal integrated. According to the procedure the period of time is firstly divided into a first and a second partial period of time. The first and second partial periods of time are each at least twice as long as a pulse repetition interval that is used during the first partial period of time. According to the procedure the radar unit is controlled during the first partial period of time so that it transmits radar pulses for the measurement of target data with a higher energy content than what is possible in a steady state. The transmission of radar pulses with a higher energy content takes place in such a way that the transmitted energy from the radar unit during the period of time amounts at the most to the possible energy transmission of the radar unit in a steady state during a corresponding period of time. A more efficient signal integration is thereby achieved as the target echoes that originate from the radar unit are concentrated in the first partial period of time. The radar unit is controlled so that it does not transmit radar pulses for the measurement of target data during the second partial period of time. The ratio between the period of time and the first partial period of time is preferably proportional to the higher energy content of the radar pulses during the first partial period of time. In an application the aim is that the energy content of the radar pulses during the first partial period of time is about twice as large as what is possible in a steady state. One way of achieving a higher energy content for the radar pulses during the first partial period of time is by a lengthening of the radar pulses. Preferably the range bins are lengthened by proportionally the same amount as the radar pulses. As no radar pulses for the measurement of target data are transmitted during the second partial period of time, the radar unit can be used for data communication during the second partial period of time. Gaps will arise in the cover if the period of time is repeated and the second partial period of time occurs in the same beam direction sweep after sweep/revolution after revolution. Either the repetition of the period of time can be such that respective second partial periods of time do not occur in the same beam direction in a subsequent sweep or the sweep speed (the speed at which the antenna beam sweeps) can be reduced, for example proportionally, depending upon the length of the second partial period of time. One method of preventing the respective second partial periods of time from occurring in the same beam direction is, for example, for the period of time not to be repeated continually, that is to say that a suitable variable time delay is inserted between successive periods of time in order thereby to avoid gaps in the cover.

The antenna is preferably an electronically controlled antenna (ECA) and in addition the period of time is repeated continually with or without time delays between successive periods of time.

The above aims are achieved according to the invention also by a radar unit comprising a radar transmitter, a radar receiver, a control unit and range bins/resolution elements. The control unit is arranged so that for the measurement of target data it controls the radar transmitter so that it transmits radar pulses and the radar receiver so that it receives target echoes which originate from the transmitted radar pulses in such a way that the performance of the radar unit increases in order thereby to achieve a longer range during a period of time. The target echo energy is signal integrated in the range bins. According to the invention the period of time is divided into a first and a second partial period of time. The first and the second partial periods of time are each twice as long as a pulse repetition interval that is used during the first partial period of time. The control unit is also arranged to control the radar transmitter during the first partial period of time so that it transmits radar pulses for the measurement of target data with a higher energy content than what is possible in steady state. The transmission of radar pulses with a higher energy content takes place in such a way that the energy transmitted from the radar unit during the period of time amounts at the most to the possible transmission of energy from the radar unit in a steady state during a corresponding period of time. A more efficient signal integration is thereby achieved as the target echo that originates from the radar unit is concentrated in the first partial period of time. The control unit is also arranged to control the radar transmitter so that it does not transmit radar pulses for the measurement of target data during the second partial period of time. The ratio between the period of time and the first partial period of time is preferably proportional to the higher energy content of the radar pulses during the first partial period of time. One variant is for the control unit to be arranged to control the radar transmitter so that it transmits radar pulses for the measurement of target data with an energy content during the first partial period of time that is about twice as large as what is possible in a steady state. One possibility is for the control unit to be arranged to cause the radar transmitter to lengthen the radar pulses that are transmitted for the measurement of target data in order thereby to achieve the higher energy content for the radar pulses during the first partial period of time. Preferably the range bins are lengthened by proportionally the same amount as the radar pulses. As no radar pulses for the measurement of target data are transmitted during the second partial period of time, the control unit can be arranged to control the radar transmitter and/or the radar receiver for data communication during the second partial period of time. Gaps will arise in the cover if the period of time is repeated and the second partial period of time occurs in the same beam direction sweep after sweep. Therefore it is suitable that when repeating a period of time the control unit is also arranged to control the radar transmitter and radar receiver in such a way that the respective second partial periods of time do not occur in the same beam direction in subsequent sweeps in order to avoid gaps arising in the cover of the sweep. As an alternative the sweep speed (the speed at which the antenna beam sweeps) can be reduced, for example proportionally, depending upon the length of the second partial period of time. The antenna is preferably an electronically controlled antenna (ECA). The period of time is suitably repeated continually with or without time delays between successive periods of time.

This invention has a number of advantages compared with previously known techniques. The invention does not require extensive modifications to existing radar units that want to benefit from the invention, such as the replacement or supplementing of the output stage. The invention can be easily connected and disconnected. The energy requirement of a radar unit that implements the invention does not increase in spite of an improvement in the performance being attained.

BRIEF DESCRIPTION OF THE DRAWINGS

In the following the invention will be described in greater detail for the purpose of explanation and in no way for the purpose of restriction, with reference to the attached figures, where.

DETAILED DESCRIPTION

Figure 1:
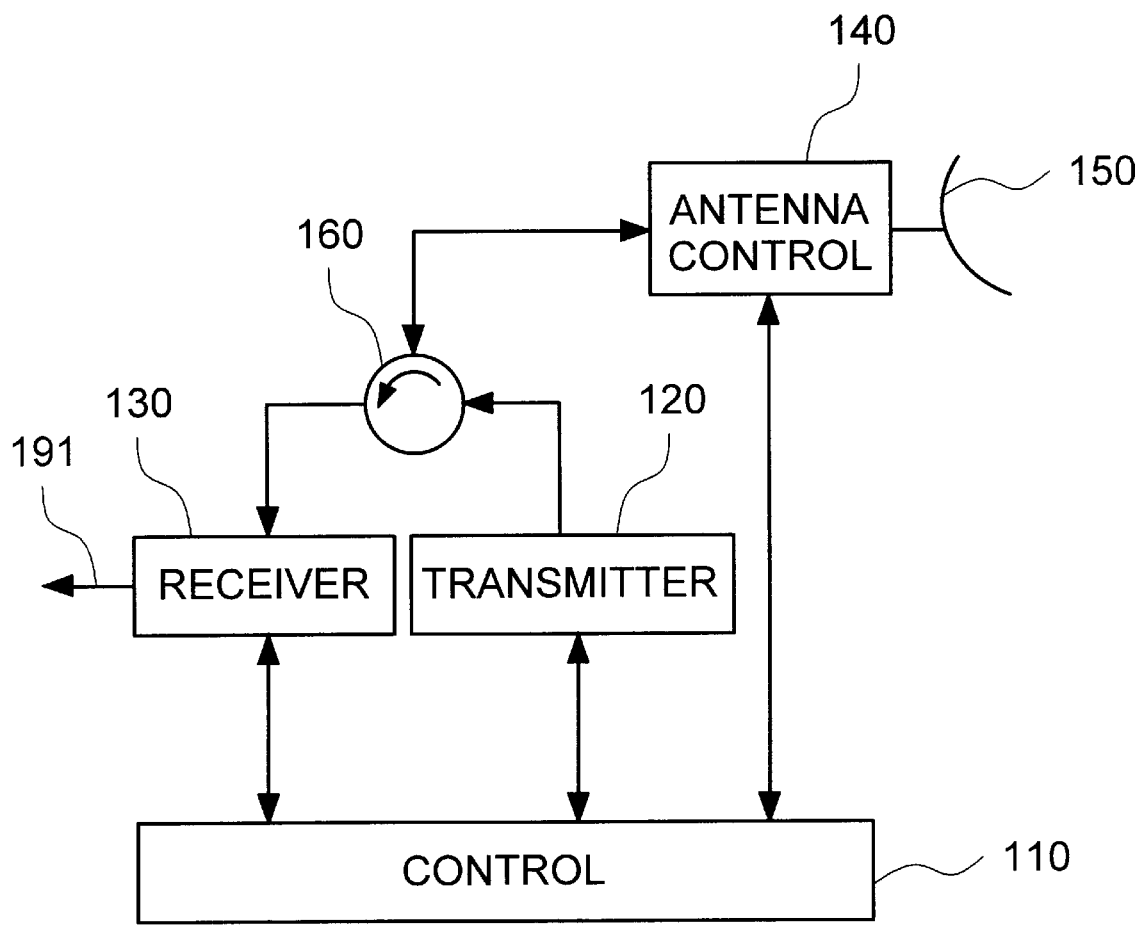
FIG. 1 shows a block diagram of a radar unit in accordance with the invention.

The aim of this invention is to increase the performance of a radar unit. In order to clarify the invention some examples of its application will be described in the following with reference to the FIGS. 1 and 2.

The basic idea of this invention is to increase the performance of a radar unit and thereby achieve a possible improvement in range by means of more efficient integration of target echo signals.

The performance of a radar unit is largely dependent upon the signal processing that a received target echo signal undergoes. One of the purposes of the signal processing is to improve the signal to noise ratio (SNR). If the signal to noise ratio can be improved, the radar unit can detect weaker target echo signals and indicate these as target echoes. Weaker target echo signals come from targets that are situated further away from the radar unit and/or have a smaller equivalent target area than target echo signals that come from targets that are situated closer to the radar unit and/or targets with a larger equivalent target area.

The signal processing in a radar unit usually comprises the integration of received target echo signals in several stages and in various ways with the aim of improving the signal to noise ratio. Some of the different integration stages are usually called signal integration and usually comprise coherent integration and non-coherent video integration. The accumulation of probabilities of detection that takes place with successive beam sweeps (antenna sweeps) can also be regarded as an integration and is called a variant of integration. The different types of integration have different limitations and efficiency.

Coherent integration improves the signal to noise ratio by a factor n, where n is the number of samples. It should be mentioned here in passing that it is assumed that all signal processing is carried out digitally which is usual in a modern radar unit. There is, however, nothing to prevent a signal being processed as analog signals or by a combination of analog and digital signal processing, as the invention is not dependent upon what method is used for the signal processing.

Video integration improves the signal to noise ratio by a factor that can approximately be described as $n^{0.7}$, that is not such an efficient improvement as coherent integration. The time extent of the signal integration (coherent and non-coherent) is limited by the requirement that the target echo signals must remain in one and the same range bins/resolution elements during the integration period. This sets in principle a practical upper limit for possible signal integration as targets normally move. Signal integration outside the period when the target echo signals remain in a range bin has no effect.

The signal to noise ratio after the signal integration gives a certain probability of target detection. Successive beam sweeps thus give an accumulated probability of detection. Finally therefore the accumulation is attained which can be regarded as an integration of the type 1/n, that is to say that the target must be able to be detected at least once in the course of n attempts. The efficiency of this accumulation is however usually low, particularly if it is based on only moderately large probabilities of detection per beam sweep (for example less than 10%).

The invention is based, as mentioned earlier, on carrying out a more efficient integration of target echo signals. A more efficient integration of target echo signals is achieved according to the invention by means of improving the coherent integration and/or video integration at the expense of the less efficient accumulation.

This is made possible suitably by means of a momentary increase in the output (average power) of the radar unit for short periods, typically 100 ms (corresponding to approx. 100–1000 pulses), with corresponding periods of radar silence so that the average power measured over a longer period will not be changed. Preferably the average power of the radar unit is doubled during the short periods. The radar unit will then alternately have equally long periods with double output as with radar silence, so that the average power measured over a longer period (seconds) will not be changed.

The reason that it is not desirable/possible (without modifications to the radar unit) to change the average power of the radar unit over a longer period is that the radar unit is designed for a particular energy supply. The output stage of the radar unit, that can for example contain magnetrons, travelling wave tubes (TWT) or semiconductors, is normally constructed to withstand a particular average power, in particular with regard to the cooling of the final stage. An advantageous embodiment is that the doubling of the output is carried out by a lengthening of the pulse lengths This means that the components are not subjected to a higher peak power and it is only the cooling requirement that increases momentarily. If, however, the average power over a longer period (seconds) is the same as before, the cooling requirement also does not increase.

As the radar unit is "silent" for a certain part of the time (half the time in the case of a momentary doubling of the output) "empty" gaps occur if the same sweep/rotation speed of the antenna is maintained. This can be solved by either halving (for a doubling of the output effect) the sweep/rotation speed of the antenna or by ensuring that the "empty" gaps do not occur in the same directions in successive antenna sweeps. This reduces the measurement rate and the invention is therefore best utilized in, for example, a reconnaissance radar with a relatively small and limited search volume such as in the nose of a reconnaissance aircraft that only "sees" forwards. A radar unit that uses the invention can suitably be equipped with an electronically controlled antenna (ECA). An electronically controlled antenna can be controlled in a simple way in such a way that it can change between "half" sweep speed and "full" sweep speed with the avoidance of "empty" gaps occurring in the same direction in successive antenna sweeps, depending upon for example the actual requirement.

The method of transmitting with periodic momentarily higher output thus makes possible a better signal integration at the expense of a smaller accumulation effect (lower measuring rate).

In a first example of performance improvements it is assumed that a possible integration time is T seconds with regard to possible movement by the target. The received target energy with doubled transmitted energy during T is then twice as large compared with a radar unit with constant transmitted energy. This involves an improvement in the signal to noise ratio of +3 dB at double pulse energy. Because the radar unit is silent for half the time, there is a lower measurement rate and thereby accumulation effect, as a result of which the net gain is reduced to typically +2 dB.

In a second example of performance improvements it is assumed that the momentarily doubled transmitted energy is achieved with a doubled pulse length, which then also results in a doubled range bin in the radar receiver. Thereby with regard to the requirement concerning the position of the target in the range bin the integration time can be doubled to 2*T seconds. We thus obtain during the integration period quadruple target echo energy (one factor two from the double average power and one factor two from the double integration time).

An estimation of the gain in sensitivity is carried out in this way: a more efficient coherent integration is responsible for approx. +3 dB gain as a result of the momentarily doubled transmitted energy. Video integration is responsible for approx. +2 dB as a result of the doubled integration period. The updating rate is reduced by a factor of four for which reason a loss of approx. −2 dB arises and a net gain of approx. +3 dB can be expected.

FIG. 1 shows a block diagram of a radar unit that utilizes the invention. The radar unit comprises a control unit 110, a transmitter 120, a receiver 130, an antenna control unit 140, an antenna 150 and a Send/Receive selector/circulator 160. The control unit 110 controls the transmitter 120 so that it transmits radar pulses via the Send/Receive selector and the antenna 150. The antenna 150 together with the antenna control unit 140 can be mechanically controlled so that sweeps with the antenna beam only mean that the antenna 150 physically moves or can preferably be electronically controlled (ECA—Electronically Controlled Antenna). A target echo signal is returned to the radar unit via the antenna 150 and the Send/Receive selector 160 to the receiver 130. Further signal processing and display is carried out on the signals 191 from the receiver 130 and not shown in the figure. According to the invention the control unit 110 controls the transmitter 120 in such a way that the transmitter 120 during a predetermined time, transmits radar pulses with a higher average power than the nominal average power of the radar unit. The higher transmitted average power is preferably a doubling of the average power compared with the nominal average power of the radar unit. The increase in average power takes place preferably by means of a lengthening of the radar pulses. The predetermined time that the transmitter 120 transmits with a higher average power is in proportion to the increase in the average power and is maximized to the time a standardised target remains in a range bin which is about 50–200 milliseconds. In proportion to the increase in output and the duration of the increase, the control unit 110 controls the transmitter 120 to give radar silence so that the transmitted average power over longer periods of time (of the order of seconds) is the same as the nominal average power of the radar unit. The control unit 110 also controls the antenna control unit 140 in such a way that the sweep/rotation of the antenna 150 is adjusted in the required way and as necessary for the periods of increased average power and the periods of radar silence. The control unit 110 also controls the receiver 130 so that it is "synchronized" with the sweep/rotation speed and with the periods of radar silence and the periods with higher transmitted average power.

As a result of a radar unit, according to the invention, preferably only working for half the time, the antenna beam and radar receiver are available for other tasks for 50% of the time. Radio intelligence, data link reception and/or data transmission are examples of possible areas of use. The advantages of being able to use the antenna for other tasks during the "silent" periods are particularly apparent in systems with electronically controlled antennas (ECA) due to the inertia-free beam control.

Figure 2:
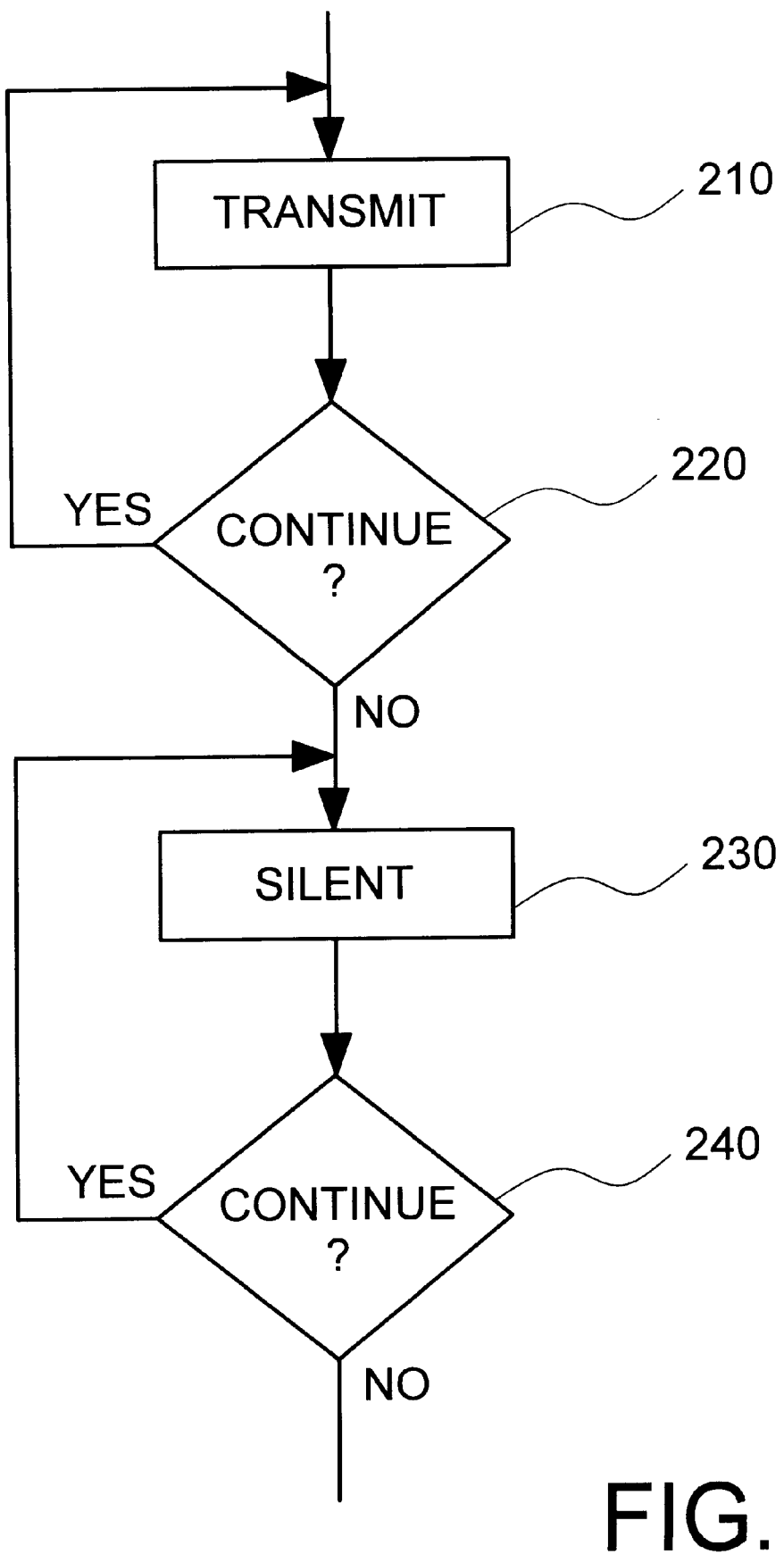
FIG. 2 shows a flow diagram of a method in accordance with the invention.

FIG. 2 shows a flow diagram of a procedure according to the invention. In a transmission stage 210 the radar unit transmits a radar pulse for the measurement of target data with a higher energy content than what is possible in a steady state. A first test stage 220 tests whether further radar pulses for the measurement of target data are to be transmitted. As described earlier the invention divides up a period of time into two parts, a first partial period of time and a second partial period of time. During the first partial period of time the radar unit transmits radar pulses with higher energy content than what is possible in a steady state. The higher energy content is so arranged that the average transmitted energy of the radar unit during the period of time corresponds closely to the possible energy transmission of the radar unit in a steady state. The length of the first partial period of time is at least twice as long as a pulse repetition interval that is used during the first partial period of time. Depending upon the type of radar unit, for example a hundred radar pulses (a pulse group, or a number of pulse groups) can be the smallest number of radar pulses that have to be transmitted in a sequence in order for the radar function to be ensured. The first test stage 220 counts the radar pulses that are transmitted for the measurement of target data so that the right number of radar pulses that are to be transmitted during the first partial period of time are transmitted. As long as further radar pulses are to be transmitted the transmission stage 210 is repeated. Thereafter follows a non-transmission stage 230 which in combination with a second test stage 240 ensures that no radar pulses for the measurement of target data are transmitted during the second partial period of time. If required, pulses with low output can be transmitted during the second partial period of time for data communication purposes. Normally it is sufficient for these pulses to be transmitted with low output as they only have to travel one way. The energy content of these pulses is usually negligible but should be included in the calculations of the average transmitted energy of the radar unit during the period of time in those cases where the radar transmitter is used to transmit these data communication pulses. After the second test stage 240 indicates that the second partial period of time is completed either a new period of time can follow whereby the procedure continues with the transmission stage 210 directly or the procedure can continue with a predetermined time delay during which the radar unit, for example, operates with its ordinary radar function until any new period of time follows.

In the preceding examples it has been assumed that the output has been doubled periodically. Both lower and higher output increases are possible but result in other percentage silent periods. In the case, for example, of difficulty in achieving radar pulses with double energy content even for short periods due to the equipment, a certain increase in performance is possible even with moderate momentary increases of the energy content of the radar pulses.

This invention is not restricted to the embodiments mentioned above, but can be varied within the framework of the following patent claims.

What is claimed is:

1. Procedure for controlling, in a radar unit comprising range bins in which target echo energy is signal integrated, the transmission of radar pulses and the reception of target echoes during a period of time in such a way that the performance of the radar unit is increased, comprising the steps of:

dividing the period of time into a first and a second partial period of time where the first and the second partial periods of time are each at least twice as long as a pulse repetition interval which is used during the first partial period of time;

controlling the radar unit during the first partial period of time so that radar pulses for the measurement of target data are transmitted with a higher energy content than what is possible in a steady state, in such a way that the transmitted energy of the radar unit during the period of time amounts at the most to the possible energy transmission of the radar unit in a steady state during a corresponding period of time, in order thereby to achieve a more efficient signal integration by means of the integration of target echoes that originate from the radar pulses transmitted from the radar unit being concentrated during the first partial period of time; and controlling the radar unit so that it does not transmit radar pulses for the measurement of target data during the second partial period of time.

2. Procedure according to claim 1, wherein the ratio between the period of time and the first partial period of time is proportional to the higher energy content of the radar pulses during the first partial period of time.

3. Procedure according to claim 1, wherein the energy content of the radar pulses during the first partial period of time is about twice as large as what is possible in a steady state.

4. Procedure according to claim 1, wherein the higher energy content of the radar pulses during the first partial period of time is achieved by a lengthening of the radar pulses.

5. Procedure according to claim 4, wherein the range bins are lengthened proportionally by the same amount as the radar pulses are lengthened.

6. Procedure according to claim 1, wherein the radar unit is used for data communication during the second partial period of time.

7. Procedure according to claim 1, wherein in the event of a repetition of the period of time, respective second partial periods of time do not occur in the same beam direction during subsequent sweeps so that there will not be gaps in the cover.

8. Procedure according to claim 1, wherein the speed at which the antenna beam sweeps is reduced in dependence upon the length of the second partial period of time so that there will not be gaps in the cover.

9. Procedure according to claim 1, wherein the radar pulses are transmitted via an electronically controlled antenna (ECA).

10. Procedure according to claim 1, wherein the period of time is repeated continually.

11. Radar unit comprising a radar transmitter, a radar receiver, a control unit and range bins in which target echo energy is signal integrated, wherein the control unit is arranged to control the radar transmitter so that it transmits radar pulses for the measurement of target data and to control the radar receiver so that it receives target echoes originating from the transmitted radar pulses in such a way that the performance of the radar unit is increased during a period of time, and wherein:

the period of time is divided into a first and a second partial period of time where the first and the second partial periods of time are each at least twice as long as a pulse repetition interval which is used during the first partial period of time;

the control unit is also arranged to control the radar unit during the first partial period of time for the measurement of target data so that it transmits radar pulses with a higher energy content than what is possible in a steady state, in such a way that the transmitted energy of the radar unit during the period of time amounts at the most to the possible energy transmission of the radar unit in a steady state during a corresponding period of time, in order thereby to achieve a more efficient signal integration by means of the signal integration of target echoes that originate from the radar pulses transmitted from the radar unit being concentrated during the first partial period of time;

the control unit is also arranged to control the radar unit so that it does not transmit radar pulses for the measurement of target data during the second partial period of time.

12. Radar unit according to claim 11, wherein the ratio between the period of time and the first partial period of time is proportional to the higher energy content of the radar pulses during the first partial period of time.

13. Radar unit according to claim 11, wherein the control unit is also arranged to control the radar transmitter so that it transmits radar pulses for the measurement of target data with an energy content during the first partial period of time that is about twice as large as what is possible in a steady state.

14. Radar unit according to claim 11, wherein the control unit is also arranged to control the radar transmitter so that it lengthens the radar pulses that are transmitted for the measurement of target data, in order thereby to achieve the higher energy content of the radar pulses during the first partial period of time.

15. Radar unit according to claim 14, wherein the range bins are lengthened proportionally by the same amount as the radar pulses are lengthened.

16. Radar unit according to claim 11, wherein the control unit is also arranged to control the radar transmitter and/or the radar receiver for data communication during the second partial period of time.

17. Radar unit according to claim 11, wherein in the event of a repetition of the period of time, the control unit is also arranged to control the radar transmitter and radar receiver in such a way that the respective second partial periods of time do not occur in the same beam direction during subsequent sweeps so that there will not be gaps in the cover within the sweep.

18. Radar unit according to claim 11, wherein the speed at which the antenna beam sweeps is reduced in dependence upon the length of the second partial period of time so that there will not be gaps in the cover.

19. Radar unit according to claim 11, wherein the radar pulses are transmitted via an electronically controlled antenna (ECA).

20. Radar unit according to claim 11, wherein the period of time is repeated continually.

* * * * *